(12) United States Patent
Shimizu et al.

(10) Patent No.: US 11,038,395 B2
(45) Date of Patent: Jun. 15, 2021

(54) ROTOR OF ROTARY ELECTRICAL MACHINE

(71) Applicant: Mitsubishi Electric Corporation, Tokyo (JP)

(72) Inventors: Shintaro Shimizu, Tokyo (JP); Kenji Maekawa, Tokyo (JP); Toru Ishikawa, Tokyo (JP); Yoshiro Imazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/303,227

(22) PCT Filed: May 31, 2016

(86) PCT No.: PCT/JP2016/065996
§ 371 (c)(1),
(2) Date: Nov. 20, 2018

(87) PCT Pub. No.: WO2017/208335
PCT Pub. Date: Dec. 7, 2017

(65) Prior Publication Data
US 2019/0207463 A1 Jul. 4, 2019

(51) Int. Cl.
*H02K 3/52* (2006.01)
*H02K 1/24* (2006.01)
*H02K 3/32* (2006.01)

(52) U.S. Cl.
CPC ............. *H02K 3/528* (2013.01); *H02K 1/243* (2013.01); *H02K 3/325* (2013.01)

(58) Field of Classification Search
CPC ......... H02K 3/528; H02K 3/325; H02K 1/243
(Continued)

(56) References Cited

U.S. PATENT DOCUMENTS

| 3,603,825 A | 9/1971 | Sheridan |
| 5,174,013 A * | 12/1992 | Hiroshima ............... H02K 3/18 29/605 |

(Continued)

FOREIGN PATENT DOCUMENTS

| FR | 2 818 823 A1 | 6/2002 | |
| FR | 2818823 * | 6/2002 | ............... H02K 3/52 |

(Continued)

OTHER PUBLICATIONS

International Search Report of PCT/JP2016/065996 dated Aug. 16, 2016.

(Continued)

*Primary Examiner* — Ahmed Elnakib
(74) *Attorney, Agent, or Firm* — Sughrue Mion, PLLC; Richard C. Turner (57) ABSTRACT

A winding-start receiving groove in which a winding-start lead wire of a field coil is received is formed in an inner surface of a flange of an insulation bobbin. A holder is disposed on the flange and located on a radially outer side of the winding-start receiving groove. The holder is formed with a holder groove located on an extension line of the winding-start receiving groove and extending at an angle relative to a radial direction of the insulation bobbin. The winding-start lead wire of the field coil is received in the winding-start receiving groove and the holder groove and held by the holder. This makes it possible to obtain a rotor of a rotary electrical machine with a simplified configuration at low cost not only to improve winding workability but also to enhance electrical reliability and durability.

10 Claims, 6 Drawing Sheets

(58) Field of Classification Search
USPC .................. 310/194, 263, 71, 49.13, 156.66
See application file for complete search history.

(56) References Cited

U.S. PATENT DOCUMENTS

| | | | | |
|---|---|---|---|---|
| 5,886,451 | A * | 3/1999 | Hatsios .................. | H02K 3/528 29/597 |
| 6,037,694 | A * | 3/2000 | Asao ........................ | H02K 3/18 310/164 |
| 6,107,719 | A * | 8/2000 | Asao ....................... | H02K 15/09 310/179 |
| 6,114,786 | A * | 9/2000 | Ishida .................... | H02K 3/528 310/194 |
| 7,928,822 | B2 * | 4/2011 | Suzuki ..................... | H01F 5/02 29/605 |
| 7,956,507 | B2 * | 6/2011 | Tokizawa ............... | H02K 3/528 29/598 |
| 9,995,076 | B1 * | 6/2018 | Hoffberg ................. | E05F 3/102 |

FOREIGN PATENT DOCUMENTS

| | | | |
|---|---|---|---|
| JP | 51-005913 | U1 | 1/1976 |
| JP | 52-139950 | A | 11/1977 |
| JP | 62-138041 | A | 6/1987 |
| JP | 08-331786 | A | 12/1996 |
| JP | 11-273933 | A | 10/1999 |
| JP | 2000-083337 | A | 3/2000 |
| JP | 2015-211525 | A | 11/2015 |
| JP | 2015211525 | * | 11/2015 |

OTHER PUBLICATIONS

Communication dated Sep. 24, 2019, from the Japanese Patent Office in counterpart Application No. 2018-520237.
Communication dated Oct. 9, 2019 from the European Patent Office in application No. 16903963.3.
The First Office Action dated Dec. 18, 2019 from the China National Intellectual Property Administration in Application No. 201680086082.3.
Communication dated Aug. 31, 2020 from the China National Intellectual Property Administration in Application No. 201680086082.3.
Communication dated Apr. 7, 2020, from the European Patent Office in European Application No. 16903963.3.
Communication dated Dec. 16, 2020 by the European Patent Office in application No. 16 903 963.3.
The Third Office Action dated Jan. 11, 2021, from the China National Intellectual Property Administration in Application No. 201680086082.3.

* cited by examiner

ROTOR OF ROTARY ELECTRICAL MACHINE

CROSS REFERENCE TO RELATED APPLICATIONS

This application is a National Stage of International Application No. PCT/JP2016/065996 filed May 31, 2016.

BACKGROUND OF THE INVENTION

Field of the Invention

The present invention relates to a rotor of a vehicular alternating-current (AC) generator mounted as a rotary electrical machine on, for example, a vehicle, and driven by an engine of the vehicle to generate power and, in particular, relates to a configuration of an insulation bobbin on which a field coil of the rotor is wound.

Description of the Related Art

As an insulation bobbin of a field coil used for a rotor of a rotary electrical machine of the related art, an insulation bobbin is known in which a groove is formed in an inner surface of a side flange of a cylindrical portion on which a coil is wound, a winding-start lead wire of the field coil is inserted in this groove, and the field coil is regularly wound on the cylindrical portion. A lead wire end twisting portion to which an end of the winding-start lead wire inserted in the groove is secured is provided on an outer circumferential portion of the flange in close vicinity of a radially outer end portion of the groove to prevent the wire on the end twisting portion from entering the inner surface of the flange of the bobbin. With the lead wire end twisting portion being at a position away (displaced in an axial direction) from a position on the outer circumference of the flange, a molding die assembly is dividable at the outer circumference of the flange to simplify the molding die assembly (see, for example, patent document 1).

As an alternative example of the lead wire end twisting portion, a notch groove formed in one of flanges is known. The notch groove is open in the outer circumference of the flange, penetrates the flange in an axial direction, and functions not only to lead but also to hold a lead wire (see, for example, patent document 2).

Patent document 1: JP-A-52-139950
Patent document 2: JP-A-11-273933

A rotor in operation is constantly affected by centrifugal force, and a coil of the rotor having a less degree and a narrower range of plastic deformation is desirable in view of durability. In the example of the rotor of the rotary electrical machine disclosed in patent document 1, end-twisting onto a coil lead wire securing portion is unnecessary but end-twisting onto the lead wire end twisting portion is needed so that damage to the wire and deformation of the wire unavoidably decrease mechanical strength. Also, a decrease in winding workability due to the end-twisting step is still unavoidable. The notch groove intended to improve these circumstances, which is known as disclosed in patent document 2, has a dimension correspond a thickness of the flange (such a thinness as to maintain the shape of the end-twisting portion whereas the demanded function is insulation). In the case of increasing the speed of winding to improve efficiency, it is feared whether holding of the winding-start lead wire through the notch groove is reliable enough. Then, in use as the rotor in operation, centrifugal force is exerted on and vibrates the winding-start lead wire with the groove bottom and its vicinity as the vibration origin. Thus, the notch groove has such a serious disadvantage that in the worst case, part of the rotor around the notch groove as well as components to which the lead wire is connected may be broken.

The invention has been achieved to solve the above-described circumstances, and it is therefore an object of the invention to obtain a rotor of a rotary electrical machine with which winding workability, automation, and efficiency of winding work is further improved and which enhances reliability.

SUMMARY OF THE INVENTION

A rotor of a rotary electrical machine according to the invention includes a rotation shaft, a field core, an insulation bobbin, and a field coil. The field core is attached to the rotation shaft and configured to integrally rotate with the rotation shaft. The field core includes claw-shaped magnetic poles. The insulation bobbin is secured to the field core and includes a winding portion and flanges on both sides of the winding portion in an axial direction thereof. The field coil is wound in a space region defined by the winding portion and the flanges of the insulation bobbin. A winding-start receiving groove in which a winding-start lead wire of the field coil is received is formed in an inner surface of the flange. A holder is disposed on the flange and located on a radially outer side of the winding-start receiving groove. The holder is formed with a holder groove located on an extension line of the winding-start receiving groove and extending at an angle relative to a radial direction of the insulation bobbin. The winding-start lead wire of the field coil is received in the winding-start receiving groove and the holder groove and held by the holder.

According to the invention, the winding-start receiving groove in which the winding-start lead wire of the field co is received is formed in the inner surface of the flange of the insulation bobbin. The holder is disposed on the flange and located on the radially outer side of the winding-start receiving groove. The holder is formed with the holder groove located on the extension line of the winding-start receiving groove and extending at the angle relative to the radial direction of the insulation bobbin. The winding-start lead wire of the field coil is received in the winding-start receiving groove and the holder groove and held by the holder. This makes it possible to obtain the rotor of the rotary electrical machine with the simplified configuration at low cost not only to improve winding workability but also to enhance electrical reliability and durability.

The foregoing and other object, features, aspects, and advantages of the invention will become more apparent from the foil owing detailed description of the invention when taken in conjunction with the accompanying drawings.

DESCRIPTION OF THE PREFERRED EMBODIMENTS

Preferred embodiments of a vehicular AC generator according to the invention will now be described with reference to the accompanying drawings.

Embodiment 1

Figure 1:
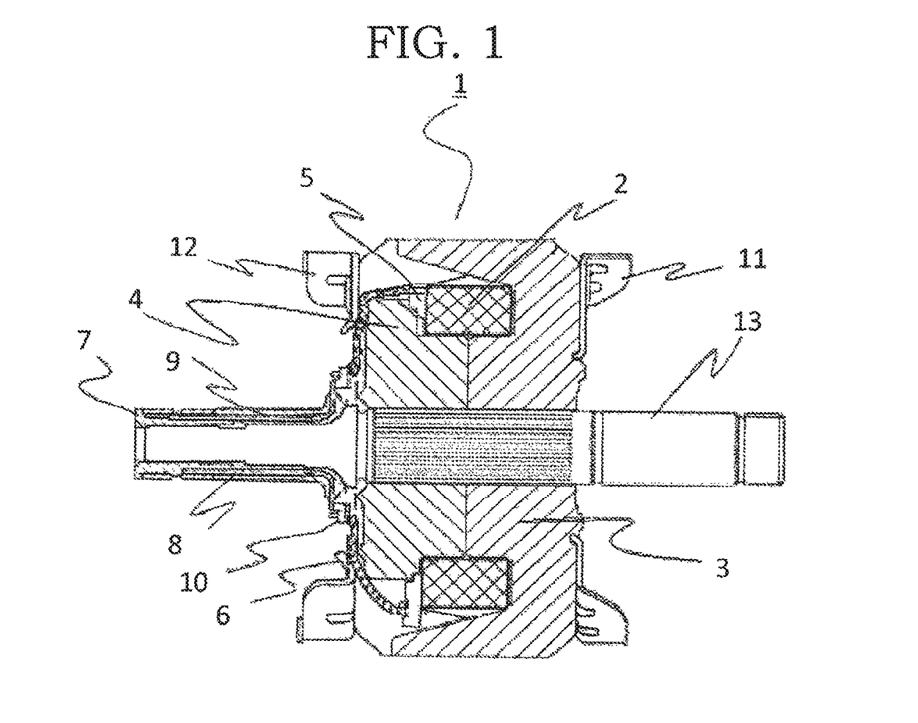
FIG. 1 is a cross-sectional view or a rotor of a rotary electrical machine according to an embodiment 1 of the invention, illustrating an exemplary configuration of the rotor.
Figure 2:
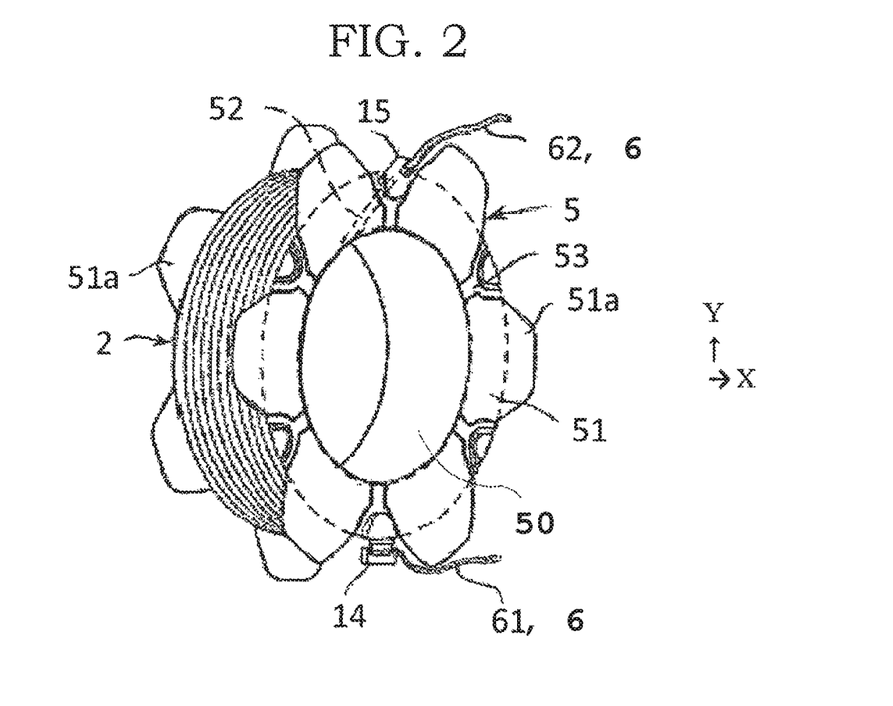
FIG. 2 is a perspective view of an insulation bobbin of the rotor in FIG. 1, and a field coil wound on the insulation bobbin.

FIG. 1 is a cross-sectional view of a rotor of a rotary electrical machine according to embodiment 1 of the invention, illustrating a configuration of the rotor, and FIG. 2 is a perspective view of an insulation bobbin of the rotor in FIG. 1, and a field coil wound on the insulation bobbin. The rotor 1 of the rotary electrical machine includes the field coil 2 to generate a magnetic flux and a field core to cover the field coil 2. The field core includes a first field core body 3 and a second field core body 4, which include claw-shaped magnetic poles (claw poles) arranged to mesh with each other. The field coil 2 is wound around a winding portion 50 of the insulation bobbin 5. A slip ring assembly 7 includes two slip rings to which a current is supplied from the outside through brushes, not illustrated. As illustrated in FIG. 1, cooling centrifugal fans 11 and 12 are respectively attached to end surfaces of the first field core body 3 and the second field core body 4 in the axial direction.

A lead wire 6 drawn from the field coil 2 is arranged in such a manner that after the field coil 2 is wound on the winding portion 50 of the insulation bobbin 5, a terminal-end lead wire 61 is twisted on and secured to a lead wire securing portion 14. The lead wire securing portion 14 is disposed on an outer circumferential portion of a flange 51 and is substantially T-shaped. In the case where winding of the field coil 2 is started from a bottom surface of the winding portion 50 of the insulation bobbin 5, a winding-start lead wire 62 is received in a winding-start receiving groove 52 formed in an inner surface of the flange 51, and then, a rotation shaft is rotated in substantially the same manner as illustrated in FIG. 9 in patent document 2 to make the lead wire wound spirally. The winding-start receiving groove 52 is a concave open grove extending in a tangential direction from an intersection between the flange 51 and the winding portion 50. The winding-start lead 62 received in the winding-start receiving groove 52 has a free end held and secured by a holder 15, described later.

Figure 3:
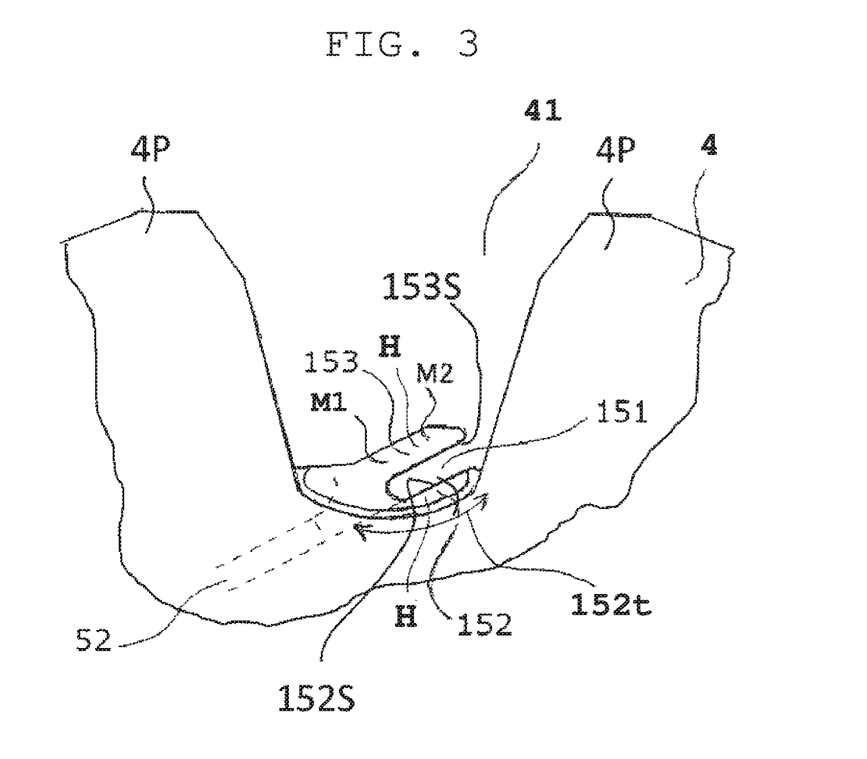
FIG. 3 is an enlarged view of an essential part of the rotor in FIG. 1.

The lead wires 6 are drawn from, the lead wire securing portion 14 and the holder 15 disposed on the flange 51 of the insulation bobbin 5, and connected to the slip ring assembly 7. At this time, the lead wires 6 extend outward from valleys 41 (FIG. 3) between adjacent claw-shaped magnetic poles 4P, 4P of the second field core body 4 along an outer end surface of the second field core body 4 and are connected to terminals 8 and 9 of the slip ring assembly 7 through a lead wire connector 10.

Figure 4A:
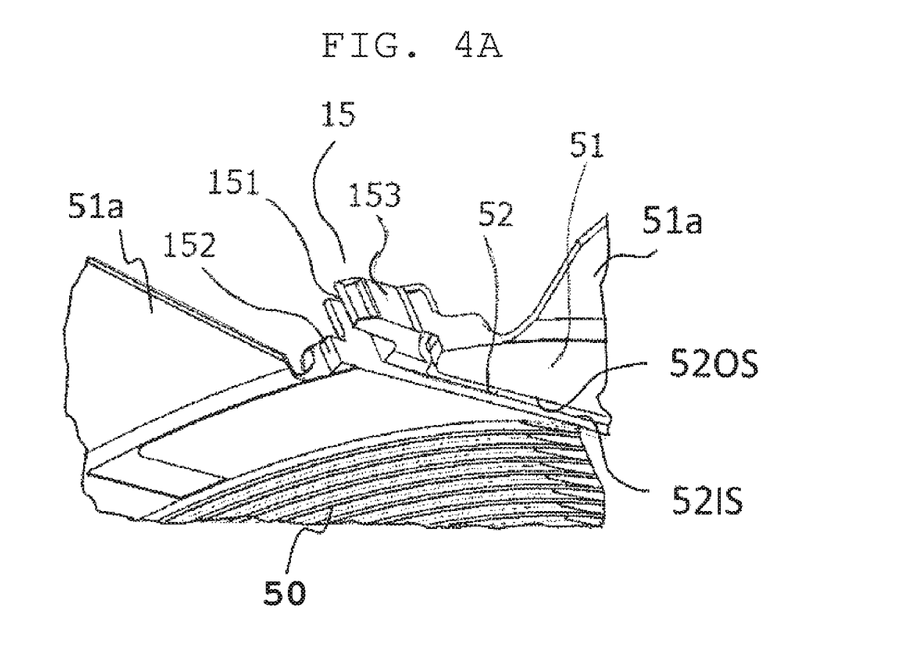
FIG. 4A is an enlarged perspective view of an essential part of the insulation bobbin of the rotor in FIG. 1, as viewed from a winding portion side.
Figure 4B:
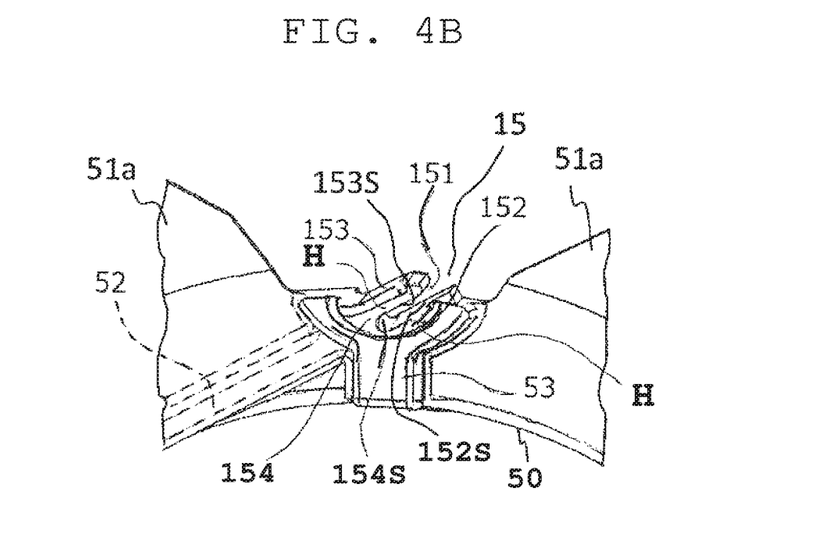
FIG. 4B is an enlarged perspective view of the essential part of the insulation bobbin of the rotor in FIG. 1, as viewed from outside.
Figure 5A:
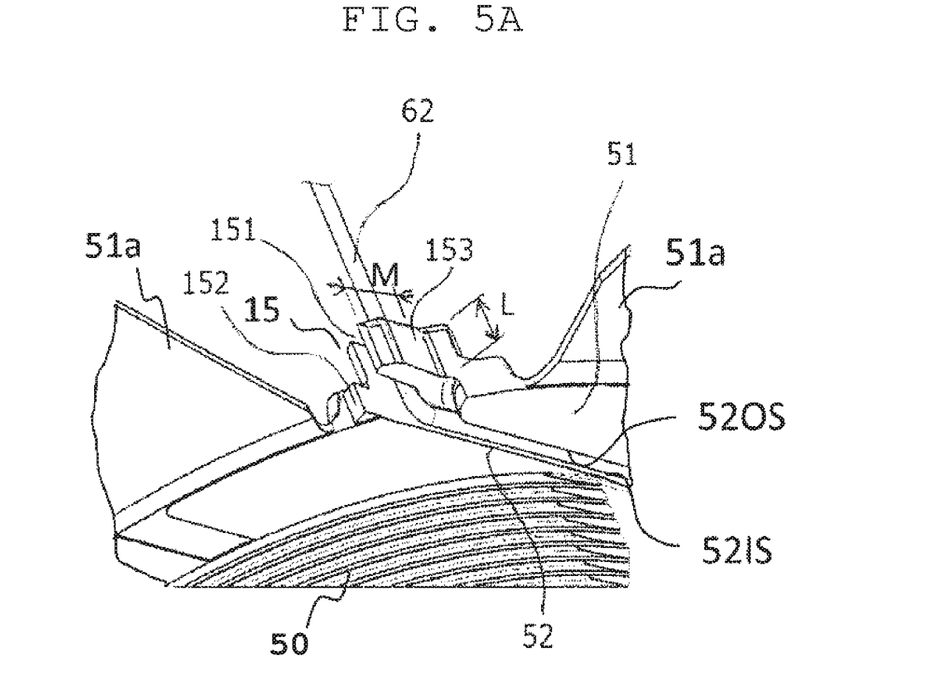
FIG. 5A is a diagram illustrating an arrangement of a coil on the insulation bobbin in FIGS. 4A and 4B, as viewed from the winding portion side.
Figure 5B:
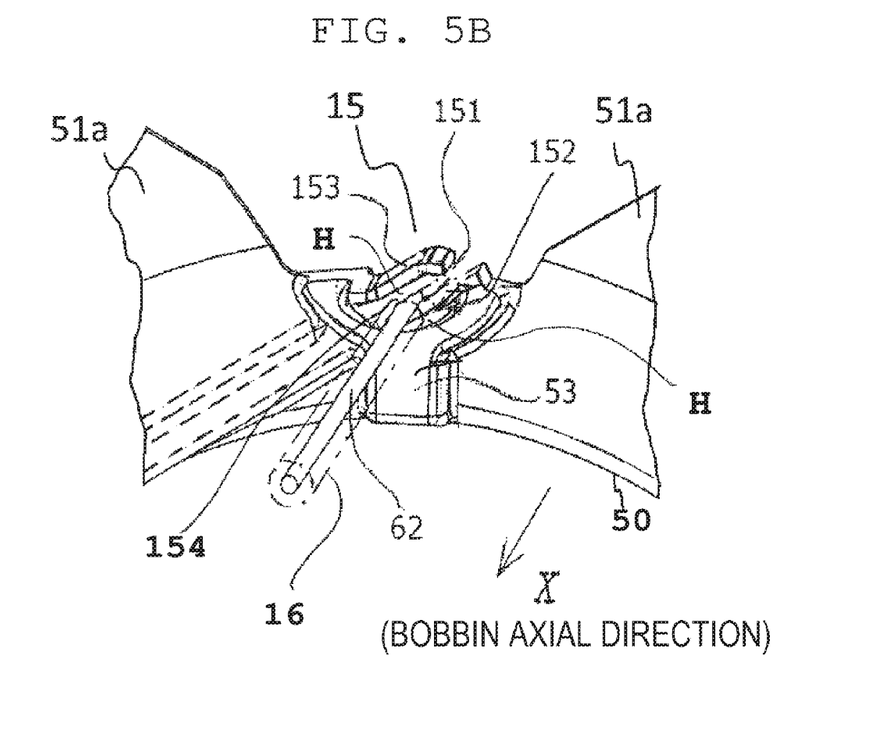
FIG. 5B is a diagram illustrating an arrangement of the coil on the insulation bobbin in FIGS. 4A and 4B, as viewed from outside.

As illustrated in FIG. 4A, the holder 15 includes a holder groove 151 continuous to the winding-start receiving groove 52. The holder 15 has a radially inner holder wall 152 on the side of the holder groove 151 that is closer to the insulation bobbin axis, and a radially outer holder wall 153 on the opposite side. A radially outer surface 152S of the radially inner holder wall 152, a radially inner surface 153S of the radially outer holder wall 153, and a holder-groove bottom surface 154S (see FIG. 4B) connecting the radially outer surface 152S and the radially inner surface 153S constitute the holder groove 151. The radially outer surface 152S of the radially inner holder wall 152 is continuous and parallel to a radially inner wall surface 52IS of the winding-start receiving groove 52. The radially inner surface 153S of the radially outer holder wall 153 is on a plane parallel to a radially outer wall surface 52OS of the winding-start receiving groove 52. The radially outer wall surface 52OS of the winding-start receiving groove 52 ends at a radial outer edge of the flange 51 not to obstruct receiving of the winding-start lead wire 62. As illustrated in FIGS. 5A and 5B, the winding-start lead wire 62 received in the winding-start receiving groove 52 extends in a groove direction (groove longitudinal direction) is guided from the radially inner wall surface 52IS of the winding-start receiving groove 52 along the radially outer surface 152S of the radially inner holder wall 152 toward the holder groove 151. Then, the winding-start lead wire 62 is held by the holder groove 151 and bent at a substantially right angle in a direction perpendicular to the groove direction of the winding-start receiving groove 52, that is, in an X-direction FIG. 5B (in a direction parallel to the insulation bobbin axis).

The groove direction of the holder groove 151 is not in the radial direction but in a direction continuous to the winding-start receiving groove 52 formed in the tangent direction from the bottom surface of the winding portion 50. Consequently, the radially inner holder wall 152 does not protrude radially outward from the radially outer edge of the flange 51 but is limited within a range between the radially outer edge of the flange 51 and the valley 41 (see FIG. 3). A valley opposed portion 152t of the radially inner holder wall 152 has such an offset shape along the valley 41 that the radially inner holder wall 152 is supported by the whole inner surface of the valley 41 when receiving a force, for example, at the time of holding the winding-start lead wire 62 or drawing the winding-start lead wire 62 to the connector at a subsequent step. This configuration prevents failures such as breakage of the radially inner holder wall 152. The configuration supported by the valley 41 also improves resistance of the holder 15 as a whole with respect to centrifugal force exerted on the holder 15 in operation.

In order to resist springback caused by a single bend, in the axial direction, of an end of the winding-start lead wire 62 received in the winding-start receiving groove 52 or resist centrifugal force, an axial length L of the holder 15 and an extension length M of the radially outer holder wall 153 are set. Desirably, the axial length L is, for example, approximately 2 times or more larger than a lead wire diameter D to maintain a desired wire-holding state after bending at a substantially right angle.

As described above, the groove direction of the holder groove 151 not in the radial direction but in the direction continuous to the winding-start receiving groove 52 formed in the tangent direction from the bottom surface of the winding portion 50 to position the radially inner holder wall 152 within the valley 41. This makes the extension length of the radially outer holder wall 153 from the radially outer edge of the flange 51 larger than the length the radially inner holder wall 152 itself. Specifically, this extension length M of the radially outer holder wall 153 includes a wire-holding function section M1 adjacent to a holder groove bottom 154 and a detachment preventing section M2 integral to the wire-holding function section M1 so that the extension length M and the axial length L resist springback caused by bending at a substantially right angle. It suffices that the wire-holding function section M1 is, for example, approximately 1.5 times as large as the lead wire diameter D, and the detachment preventing section M2 to prevent the lead wire (winding-start lead wire 62) from separating in the radially outward direction is formed within a space in the valley 41.

Figure 6:
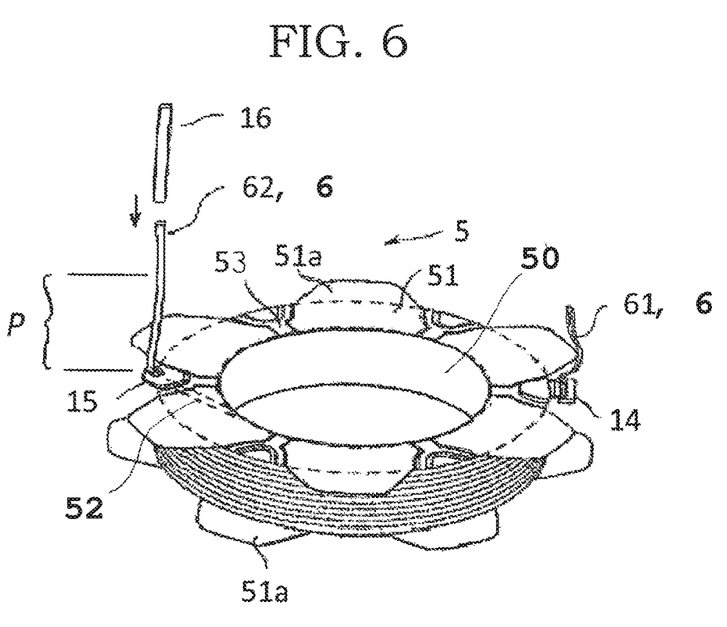
FIG. 6 is a schematic perspective view of the insulation bobbin on which the field coil is wound, illustrating a state of a winding-start lead wire when the insulation bobbin is laid flat horizontally.

Outer surfaces of the radially inner holder wall 152 and the radially outer holder wall 153 in the X-direction are flat surfaces H to define a position of an insulation tube 16 when the insulation bobbin 5 is laid flat horizontally, as illustrated in FIG. 6. The insulation tube 16 is fitted on a predetermined range P of the winding-start lead wire 62 to insulate the winding-start lead wire 62 from the second field core body 4 at subsequent steps or when the lead wire is connected to the connector. Without the configuration of the flat surfaces H (a winding-start lead wire insulation material displacement preventing portion) perpendicular to the axis, the insulation tube 16 may incline and be partly displaced into the holder 15, failing to secure the range P, that is, failing to achieve insulation as desired. This may result in a failure as an electrical component in the worst case.

As described above, the outer surfaces of the radially inner holder wall 152 and the radially outer holder wall 153 in the X-direction are the flat surfaces H (the winding-start lead wire insulation material displacement preventing portion), which constitute displacement preventing portions for the lead wire 62. Consequently, an end surface of the insulation tube (the winding-start lead wire insulation material) 16 on the holder 15 side is in contact with both of the flat surface H of the radially inner holder wall 152 and the flat surface H of the radially outer holder wall 153. This configuration prevents the insulation tube (the winding-start lead wire insulation material) 16, in which the winding-start lead wire 62 is inserted, from inclining or being displaced.

Rotation stoppers 53 are formed along the circumferential direction of the flange 51 and protrude from the flange 51 in the axial direction. The rotation stoppers 53 on a radially inner side of the holder 15 are fitted in the field core body on a radially inner side of the valley 41 between the claw-shaped magnetic poles to prevent the insulation bobbin 5 from rotating from the field core. Cover portions 51a extending from the outer end surface of the flange 51 insulate an outer circumferential surface of the circumferentially wound field coil 2 from the claw-shaped magnetic poles (claw-shaped magnetic poles 4P).

With this configuration, the end of the winding-start lead wire 62 received in the winding-start receiving groove 52 is not damaged by bending or twisting a large number of times but bent at a substantially right angle only once to eliminate or minimize deformation and also, the winding-start lead wire 62 is held in the radial direction to be reliably held and prevented from coming off so as to speed up winding work of the field coil around the insulation bobbin winding portion (winding portion 50) (normal circumferential winding work around the winding portion 50). There is no need to provide such a complicated mechanism as winding equipment in conventional cases where the winding start lead wire 62 is twisted on and secured to a neck of a substantially T-shaped component. This reduces the manufacturing cost. Moreover, displacement of the insulation tube 16 fitted on the winding-start, leadwire 62 is avoided to enhance reliability, and check of a state of the insulation tube is eliminated to improve workability.

Technical features of the embodiment 1 described above are as follows.

The rotor 1 of the rotary electrical machine includes the rotation shaft 13, the field core (first and second field core bodies 3 and 4), the insulation bobbin 5, and the field coil 2. The field core is attached to the rotation shaft 13 and integrally rotates with the rotation shaft 13. The field core includes the claw-shaped magnetic poles 4P. The insulation bobbin 5 is secured to the field core (first and second field core bodies 3 and 4) and includes the winding portion 50 and the flanges 51, 51. The field coil 2 is wound in a space region defined by the winding portion 50 of the insulation bobbin 5 and the flanges 51, 51 on both sides of the winding portion 50 in the axial direction. The winding-start receiving groove 52 in which the winding-start lead wire 62 of the field coil 2 is received is formed in the inner surface of the flange 51. The holder 15 is disposed on the flange 51 and located on a radially outer side of the winding-start receiving groove 52. The holder 15 is formed with the holder groove 151 located on an extension line of the winding-start receiving groove 52 and extending at an angle relative to the radial direction of the insulation bobbin. The winding-start lead wire 62 of the field coil 2 is received in the winding-start receiving groove 52 and the holder groove 151 and held by the holder 15.

At least one flange 51 of the flanges 51, 51 which are respectively provided on both sides of the winding portion 50 in the axial direction includes a plurality of flanges formed at predetermined intervals in the circumferential direction of the insulation bobbin 5, and the holder 15 is located in one of the predetermined intervals.

The holder 15 is at a position corresponding to the valley 41 between the magnetic poles 4P, 4P of the field core (first and second field core bodies 3 and 4).

The holder groove 151 extends in the same direction as the winding-start receiving groove 52 and is continuous to the winding-start receiving groove 52.

The holder 15 includes the radially inner holder wall 152, the holder groove bottom 154, and the radially outer holder wall 153. The holder groove 151 is defined by the radially outer surface 152S of the radially inner holder wall 152, the holder groove bottom surface 154S of the holder groove bottom 154, and the radially inner surface 153S of the radially outer holder wall 153.

The radially outer surface 152S of the radially inner holder wall 152 and the radially inner surface 153S of the radially outer holder wall 153 are parallel to each other. In other words, a radially inner surface 152S and a radially outer surface 153S of the holder groove 151 itself are parallel to each other.

The radially inner surface 153S of the radially outer holder wall 153 of the holder 15 is flush with the radially outer wall surface (52OS) of the winding-start receiving groove 52.

The valley opposed portion 152t of the radially inner holder wall 152 of the holder 15, which is opposed to the field core valley 41, is formed along the field core valley.

The winding-start lead wire insulation material displacement preventing portion (flat surfaces) H integral to the holder 15, which is to prevent displacement of the winding-start lead wire insulation material (insulation tube 16), is formed at least on the radially outer holder wall 153 of the holder 15.

Embodiment 2

Figure 7:
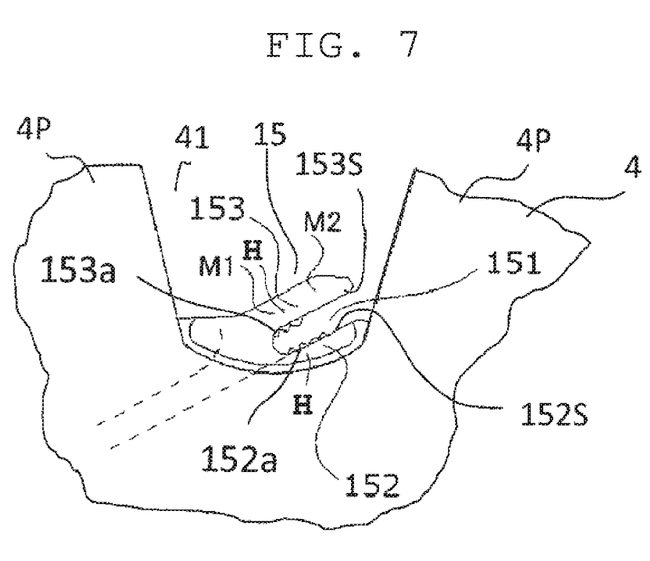
FIG. 7 is an enlarged view of an essential part of a rotor according to an embodiment 2 of the invention and corresponds to FIG. 3.

As another embodiment, for example, a configuration in which the wire-holding function is enhanced, as illustrated in FIG. 7, may be considered. At least one small protrusion 152a and at least one small protrusion 153a are respectively formed on the radially outer surface 152S of the radially inner holder wall 152 and the radially inner surface 153S of the radially outer holder wall 153 to enhance the detachment preventing effect of the winding-start lead wire 62. Moreover, in the case of providing a plurality of small protrusions, as illustrated in FIG. 7, a desired wire-holding state in accordance with a wide variety of lead wire diameters is obtained to increase general versatility and common usability of the insulation bobbin.

That is, a technical feature of embodiment 2 lies in that the winding-start lead wire detachment preventing portion 152a, 153a to prevent detachment of the winding-start lead wire is integrally formed on at least one of the radially inner holder wall and the radially outer holder wall. The winding-start lead wire detachment preventing portion is, for example, the small protrusions 152a, 153a, as illustrated in FIG. 7.

It should be noted that the examples in each of the above-described embodiments, such as the number of poles of the rotor and the configuration in which the holder and the securing portion are provided for only one of the flanges, should not be construed in a limiting sense but may be applied in various other manners.

In each of the drawings, like reference numerals and symbols denote identical or corresponding components.

Various modifications and alternations of the invention will be apparent to those skilled in the art without departing from the scope and spirit of the invention, and it should be understood that this is not limited to the illustrative embodiments set forth herein.

REFERENCE SIGNS LIST

1: rotor,
2: field coil,
3: first field core body,
4: second field core body,
4P: claw-shaped magnetic poles,
5: insulation bobbin,
6: lead wire,
7: slip ring assembly,
8, 9: terminals,
10: lead wire connector,
11, 12: cooling centrifugal fans,
13: rotation shaft,
14: lead wire securing portion,
15: holder,
16: insulation tube (winding-start lead wire insulation material),
41: valley,
50: winding portion,
51: flange,
51a: cover portion,
52: winding-start receiving groove,
52IS: radially inner wall surface,
52OS: radially outer wall surface,
53: rotation stopper,
61: terminal-end lead wire,
62: winding-start lead wire,
151: holder groove,
152: radially inner holder wall,
152a: small protrusion (winding-start lead wire detachment preventing portion),
152S: radially outer surface,
152t: valley opposed portion,
153: radially outer holder wall,
153a: small protrusion (winding-start lead wire detachment preventing portion),
153S: radially inner surface,
154: holder groove bottom,
154S: holder groove bottom surface,
H: flat surface (winding-start lead wire insulation material displacement preventing portion),
L: axial length,
M: extension length of the radially outer holder wall 153,
M1: wire-holding function section,
M2: detachment preventing section,
P: predetermined range,

What is claimed is:

1. A rotor of a rotary electrical machine, the rotor comprising:
a rotation shaft;
a field core attached to the rotation shaft and configured to integrally rotate with the rotation shaft, the field core comprising claw-shaped magnetic poles;
an insulation bobbin secured to the field core and comprising:
a winding portion; and
flanges on both sides of the winding portion in an axial direction of the winding portion; and
a field coil wound in a space region defined by the winding portion of the insulation bobbin and the flanges of the winding portion,
wherein a winding-start receiving groove in which a winding-start lead wire of the field coil is received is formed in an inner surface of one of the flanges, and a holder is disposed on that one flange and located on a radially outer side of the winding-start receiving groove, the holder being formed with a holder groove continuous to the winding-start receiving groove and extending at an angle relative to a radial direction of the insulation bobbin, the winding-start lead wire of the field coil being received in the winding-start receiving groove and the holder groove and held by groove wall surfaces of the holder groove, the holder including parallel radially inner and outer arm extensions between which said lead wire is held, and further defining a detachment preventing section preventing radial separation by said lead wire;
wherein at least one of the flanges which are respectively provided on both sides of the winding portion in the axial direction comprises a plurality of flanges formed at predetermined intervals in a circumferential direction of the insulation bobbin, and the holder is located in one of the predetermined intervals,
wherein the holder is at a position corresponding to a valley between the magnetic poles of the field core.

2. The rotor according to claim 1, wherein the holder groove extends in a same direction as the winding-start receiving groove and is continuous to the winding-start receiving groove.

3. The rotor according to claim 1, wherein the radially inner and outer arm extensions are joined at a holder groove bottom, and comprises:
   a radially inner holder wall;
   a radially outer holder wall, and
   the holder groove is defined by said groove wall surfaces, comprising a radially outer surface of the radially inner holder wall, a bottom surface of the holder groove bottom, and a radially inner surface of the radially outer holder wall.

4. The rotor according to claim 3, wherein the radially outer surface of the radially inner holder wall and the radially inner surface of the radially outer holder wall are parallel to each other.

5. The rotor according to claim 3, wherein the detachment preventing section configured to prevent detachment of the winding-start lead wire is integrally formed on at least one of the radially inner holder wall and the radially outer holder wall.

6. The rotor according to claim 5, wherein the detachment preventing section comprises protrusions formed on said radially inner and outer holder walls.

7. The rotor according to claim 5, wherein the detachment preventing section comprises an end portion of said radially outer holder wall.

8. The rotor according to claim 3, wherein the radially inner surface of the radially outer holder wall of the holder is parallel to a radially outer wall surface of the winding-start receiving groove.

9. The rotor according to claim 3, wherein a valley opposed portion of the radially inner holder wall of the holder, which is opposed to a valley of the field core, is formed along and fully supported by the valley of the field core.

10. The rotor according to claim 3, wherein a winding-start lead wire insulation material displacement preventing portion integral to the holder is formed at least on the radially outer holder wall of the holder.

\* \* \* \* \*